United States Patent

[11] 3,556,229

| [72] | Inventor | Roy I. Hawkins |
| | | Pierce, Colo. |
| [21] | Appl. No. | 752,017 |
| [22] | Filed | Aug. 12, 1968 |
| [45] | Patented | Jan. 19, 1971 |
| [73] | Assignee | Hawkins Mfg. Inc. |
| | | Pierce, Colo. |
| | | a corporation of Colorado |

[54] REPLACEABLE BLADE COMBINATION FOR DUCKFOOT CHISEL
3 Claims, 8 Drawing Figs.

[52] U.S. Cl. .................................................... 172/720,
172/730, 172/762; 30/334; 306/1.6
[51] Int. Cl. ........................................................ A01l 39/13
[50] Field of Search............................................ 172/708,
719, 730, 733, 753, 762, 720; 37/142; 306/1.5,
1.6; 83/694, 698; 30/260, 334, 336, 337, 338, 349;
101/157, 169; 118/(Inquired)

[56] References Cited
UNITED STATES PATENTS

| 1,461,136 | 7/1923 | Moore............................ | 37/142 |
| 1,494,956 | 5/1924 | Hauser et al.................. | 30/336 |
| 1,501,162 | 7/1924 | Cumfer .......................... | 30/349X |
| 1,501,948 | 7/1924 | Hill et al. ....................... | 30/337 |
| 2,607,279 | 8/1952 | Noble et al. ................... | 172/733X |

FOREIGN PATENTS

| 62,104 | 6/1955 | France ........................... | 172/719 |

Primary Examiner—Robert E. Pulfrey
Assistant Examiner—James W. Peterson
Attorney—Wilbur A. E. Mitchell ABSTRACT: A replaceable blade combination for farming plows in which a single spring-tensioned matrix yoke member is utilized to secure the replaceable blade.

PATENTED JAN 19 1971
3,556,229
SHEET 1 OF 2
FIG. 1
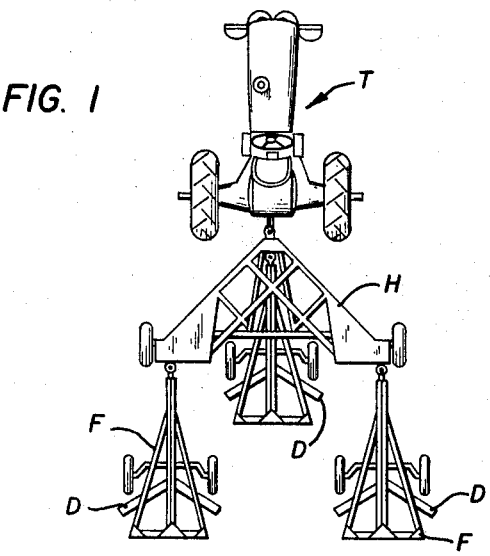
FIG. 2
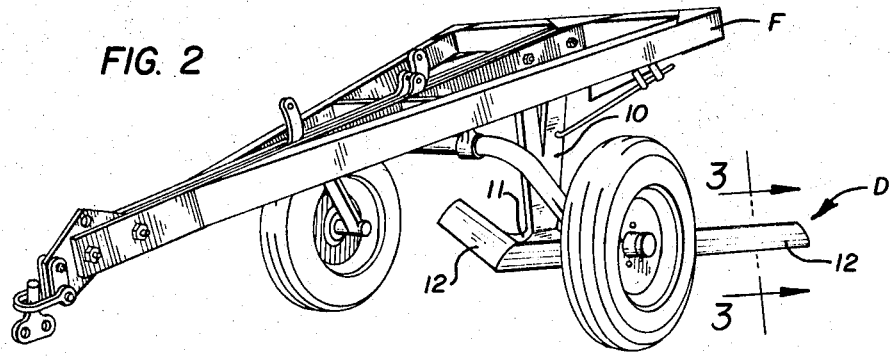
FIG. 3
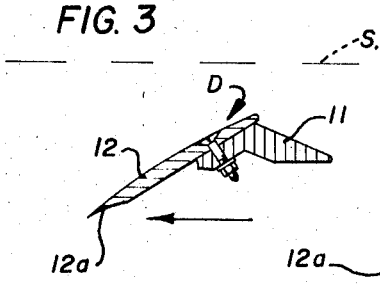
FIG. 4
INVENTOR:
Roy I. Hawkins,
BY
Wilbur C.E. Mitchell,
ATTORNEY.

3,556,229

INVENTOR:
Roy I. Hawkins,

ATTORNEY.

REPLACEABLE BLADE COMBINATION FOR DUCKFOOT CHISEL

This invention relates to so-called duckfoot V-shaped farming chisel blades, usually used in the dry land summer fallowing grain farming industry.

In conventional grain farming throughout the West, Northwest and Canadian provinces, in dry land wheat and other grain farming, it is customary to strip farm the fields. By that it is meant that a farmer divides his field into suitable usually rectangular, comparatively narrow and elongated, blocks or parallel areas, and he plants every other one of said areas, each year, and each year allows the others to go unplanted through that fall and winter. He will plant previously summer fallowed alternate strips about early fall, usually in September, to winter wheat, for example, being the planting of the strip pieces or blocks which he has just theretofore that summer kept free of weeds by what is called summer fallowing cultivation. The alternate strips not planted in the fall, are the stubble field strips from the newly harvested alternate strips that past summer, and that stubble is not disturbed but is permitted to stand through the fall and winter, to prevent soil erosion. Those stubble areas are usually first summer fallow plowed the following spring. Those alternate stubble areas are summer fallow cultivated several times during that following summer, starting about 10 months after the prior summer harvesting thereon.

Such summer fallowing is a tilling or cultivating of the soil to kill all the weeds and growth and to keep the soil comparatively loose, and so as to give the sun a chance to enrich the soil with natural nitrogen during that summer's summer fallowing cultivation. Such summer fallowing in dry land ranch areas is usually done by what is called a duckfoot chisel blade tool means of cultivation, which is by a big V-shaped rigid horizontal chisel blade which is carried by a heavy wheeled cart and pulled by a heavy tractor, to rip and loosen the ground in a horizontal plane at a depth of 6 or 8 inches just below the surface. That process is usually done 3 or 4 times from the start of spring stubble plowing, from approximately May 1 to the planting season on that soil in about September of that same year.

Said V-shaped dry land chisel blades are conventionally made of one piece hard rigid heavy steel, usually 6 or 8 feet wide, usually designed of 75° or 100° arc or horizontal sweep between the V-sides, and are carried rigidly horizontally by heavy equipment to withstand the terrific force of the pressure and friction of the soil, sand and rocks through which the blade is drawn. Naturally, the front cutter blade edge of that blade usually wears out in a comparatively short time, of one or two seasons of summer fallowing use at the most. That blade is mounted and drawn in conventional manner with its front apex V-point and chisel V-blade side edges being at about a cross-sectional 20° to 30° upwardly extending angle from the horizontal. Heretofore, so far as known, when the front lower edges of the cutter blade of such a conventional duckfoot V-shaped chisel becomes worn, it is necessary to completely replace the front cutter edge of the one-piece entire V-shaped chisel, and same is at quite a substantial expense, by a new front 6-foot wide V-shaped cutter blade edge being welded thereon to replace the worn one.

It is for the purpose of overcoming the necessity of that expensive welding replacement of the entire 6-foot wide V-shaped duckfoot chisel cutter edge, upon the front edge thereof becoming worn, that I have developed this invention.

It will be understood that the heretofore conventional V-shaped dry land duckfoot chisel, so far as known, as illustrated in my cross-sectional FIG. 3, comprises a one-piece heavy frog foot or base portion 11, to which the front one-piece V-shaped 6-foot wide chisel cutter blade portion 12 is conventionally bolted; and, when the lower edge 12a thereof becomes worn into the condition shown in FIG. 4, then the entire one-piece 6-foot wide V-shaped cutter chisel blade has to be removed, and to the lower edge 12a thereof a new V-shaped chisel blade lower edge portion 12 is welded onto that small remaining squared edge 12a. That is an expensive and tedious repair process.

It is a principle object of this invention, therefore, to provide such a dry land V-shaped duckfoot chisel blade combination with a divisible and replaceable front lower cutter blade portion, so that upon a wearing thereof that a new lower cutter blade portion may be inserted therein, in lieu of the worn front lower cutter blade portion, as a very simple method in cooperation with the frog foot thereof, and thereby have a substantial saving in the cost compared to what the cost would be if the grain farmer had to have a new entire V-shaped cutter blade portion welded thereto, or were to entirely replace the blade, as explained. Another object of my invention is to provide such a V-shaped individually replaceable duckfoot chisel blade for dry land farming, wherein the entire V-blade is constructed in portions and with the lower cutter edge portion thereof being adapted for manual replacement in separable portions upon becoming worn, without having to weld same to the worn cutter portion or without having to replace the entire V-shaped 6-foot wide blade.

Another object of this invention is the provision of such a dry land V-shaped duck chisel blade manually replaceable combination having a spring-tensioned yoke portion adapted to removably hold the front chisel cutter blade portion thereof, so that upon the blade portion becoming worn it may be manually separably replaced into said novel tensioned yoke portion.

A further object of this invention is to provide such a novel dry land replaceable V-shaped chisel blade combination which can be used for many years without having to be discarded in its entirety, upon the cutting edge portions becoming worn, and which will be economical of maintenance or replacement of the cutting edge portions thereof.

Other and further objects will be apparent to those skilled in the art from the following detailed explanation of the preferred embodiments of my invention herein, and in the drawings of which:

FIG. 1 is a reduced plan view of a tractor drawing a plurality of such conventional dry land cultivator V-shaped duckfoot chisel cultivator units D;

FIG. 2 is an enlarged perspective view of one of the dry land duckfoot chisel carriage units shown in FIG. 1;

FIG. 3 is an enlarged vertical cross-sectional view of the duckfoot chisel tool blade D, taken on the line 3—3 of FIG. 2 and looking in the direction of the arrows;

FIG. 4 is a similar vertical cross-sectional illustration of such a dry land, conventional chisel tool of FIG. 3 after several months of use, illustrating how the front leading cutter blade edge of that chisel at 12a becomes so worn that its efficiency is lost and, therefore, the entire chisel 12 blade has to be repaired or replaced;

Figure 6:
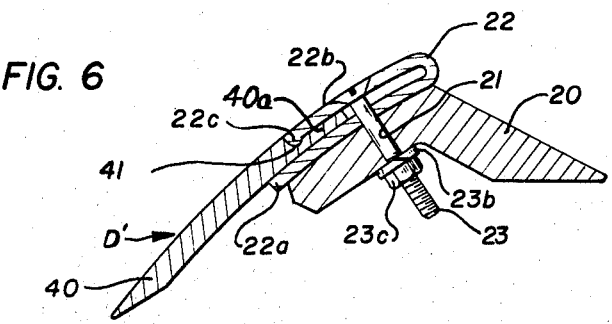
FIG. 6 is an enlarged vertical cross-sectional view of my novel replaceable duckfoot V-shaped chisel blade tool combination, taken on the line 6—6 of FIG. 5 and looking in the direction of the arrows.
Figure 7:
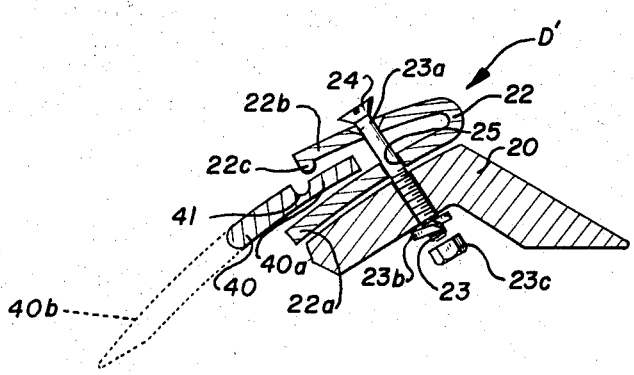
Figure 8:
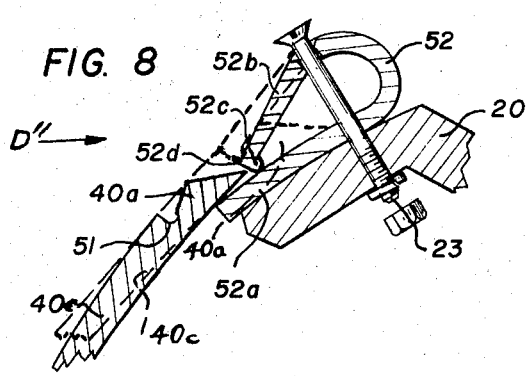

FIG. 7 is an enlarged similar cross-sectional view of the novel preferred embodiment of my replaceable duckfoot chisel blade combination shown in FIG. 6, taken on the same line as that of FIG. 6, but being an exploded view to illustrate the construction thereof, and of the spring-tensioned yoke portion 22 thereof, showing the normal spring tension action of that yoke 22 thereof upon release of the bolt 23, and of how upon such bolt release the cutter blade portion 40 thereof can be released, removed and replaced, and illustrating the portion 40b of the blade in dotted lines to show that portion as has been worn away to the point of needing to be repaired, and of how that replacement of my cutter blade portion 40 can be manually accomplished by my novel yoke and blade combination invention; and FIG. 8 is illustration of another modification of my novel spring tensioned yoke member 22, shown as 52, for use with a replaceable cutting edge blade 40.

In FIGS. 1, 2, 3 and 4, I have illustrated the conventional one-piece 6-foot wide rigid V-shaped duckfoot dry land, farming tool chisel blade D. Such a blade D is mounted by a fixed vertical carrying rigid frame 10 to a V-shaped rigid duckfoot horizontal base portion 11, and which is carried by a conventional wheel carriage indicated as F. The carriage has conventionally elevatable wheels, and is adapted to be towed by a tractor. I have shown, by a reduced diagrammatic plan view in FIG. 1, how a conventional tractor T, in the large dry land, wheat farming areas, by means of a conventional tree hitch H, usually pulls three of those dry land, chisel carriages at a time. Each of those V-shaped duckfoot chisel blade units D are usually of an overall horizontal span of about 6 feet. In FIG. 3, I illustrate the heretofore conventional method of having the front entire V-shaped 6-foot face cutter blade 12, of configuration illustrated, bolted to the horizontal frog foot base 11. I further illustrate the use of that type of a conventional blade in FIG. 4, namely, there I show how, after several weeks or months of usage, the lower edge of that entire front 6-foot wide V-shaped cutter blade 12 becomes greatly worn until there is practically none of it left below the plane of the frog foot 11, and thus necessitating a complete overhaul of that complete V-shaped front cutter blade 12 by a complete tedious remodeling welding of a new cutter 6-foot wide V-edge cutter piece 12 onto what is left of that old cutter piece, as shown in FIG. 4. The worn conventional blade 12 after such usage and before its repair before my invention is illustrated in FIG. 4.

To overcome that disadvantageous expensive repair result just explained, I have designed my novel composite and separably replaceable V-shaped duckfoot dry land, cutter blade unit combination, indicated in its entirety as D', as illustrated in my FIGS. 6, 7 and 8.

In my novel combination, to the lower edge of the conventional vertical rigid carriage support arm 10, I secure the conventional horizontal V-shaped rigid frog foot base 20, as before, and I provide a bolt opening 21 in the front angular base thereof, as illustrated. I then provide a novel horizontal U-shaped spring-tensioned matrix yoke member 22, having a base leg 22a adapted to rest on the outer surface of the front downwardly extending surface of the frog 20, and with an opening 21 therethrough for a bolt, and having an upper shorter leg portion 22b normally substantially overlapping 22a and formed as shown in exploded FIG. 7 and with 22b and also having a companion aligned opening 24 therethrough. That upper shorter leg 22b will be noted to have a downwardly depending horizontal rib 22c at its outermost under edge as shown. I provide my novel replaceable unit combination cutter blade portion 40–22, of the cross-sectional configuration as shown in FIGS. 6 and 7. Blade portion 40 has its upper portion formed as a reduced neck 40a, and at a short distance from the end of that reduced neck I form the neck with a depressed or indented horizontal groove 41 adapted to receive the rib 22c in snug meshing relationship therein, upon alignment of groove 41 with rib 22 and on spring tensioned compression of the U-shaped member 22 by the bolt and nut 23 and 23c into position as shown in FIG. 6, to clampingly thereby hold neck 40a between 22a and 22b. As viewed in FIG. 5, I form the members 22 and 40 just explained of horizontal elongation to span each side of the front V-face of the V-frog foot 20, and to abut the adjacent edges thereof at the front of the V, as the apex line 42 of that V-shaped duckfoot, with that front edge abutment as a press fit abutment without any welding at that front apex edge, thus permitting a removal and replacement of either of the members 22 or 40 on either side of that apex and of the V-shaped duckfoot independently of the other.

After continued operative use of my novel duckfoot chisel tool combination Unit D' just explained, there comes a time when there is a wearing away of the front cutter edges 12a, of the lower front edge of the chisel blade 40, and which worn away portion I have indicated by dotted lines 40b in FIG. 7. With my novel combination Unit Blade D', shown in FIGS. 5, 6 and 7, the farmer does not have to either throw away the entire chisel blade unit 40–22, when it gets in the condition as illustrated in FIG. 7. Instead, he loosens the nut 23, of each bolt 21, on a side of the V-shaped duckfoot, and the spring tension of that elongated yoke 22 will then spread the legs 22a and 22b thereof, as illustrated in FIG. 7, when the old worn blade 40 then can be removed therefrom by a slipping thereof from therebetween, and then as shown in FIG. 7 a new blade 40 can then be inserted and the nut tightened to hold the new blade thereby in place. The cost of my new blade is comparatively small, in comparison to the overall cost of the heretofore conventional overall welding repair job, heretofore explained in affixing a new cutter edge to the V-blade heretofore used as in FIG. 4.

It is to be noted, in my novel replaceable cutter blade combination, illustrated in FIGS. 6 and 7, that I purposely design the matrix yoke 22 with different length legs 22a and 22b, so that the rearward pressure against the bottom of the blade 40, held therebetween on use, will be held better by that extra length of the lower leg 22a, when bolt 23 is tightened. Further, that the extending rib 22c which I provide at the lower outer edge of leg 22, which meshes in the groove indentation 41 of the blade 40, as explained when the blade 40 is held in 22, as shown in FIG. 6, in clampingly assuring that blade 40 will be adequately held between that upper arm 22b, and lower arm 22a and thereby to the frog foot 20, by the bolt and nut 23–23c, when that nut is tightened on that bolt, as shown in FIG. 6. Thus it will be seen that I have provided a novel spring tensioned yoke clamping means for replaceably holding the cutter blade portion 40 therein. The spring tension of yoke 22, as shown in FIGS. 6 and 7, normally opens the yoke sufficiently to permit the blade 40 to be removed and a new one inserted, on the loosening of the nut 23c of the bolt 23. I counter sink the flat head of bolt 23a into the outer surface of the upper leg 22b, so that, when the bolt is secured in place by the nut 23c, the outer edge of the bolt is flush with that outer edge of the outer surface of that leg 22b, as illustrated in FIG. 6. The outer surface of the upper leg 22b of the yoke member is designed to be completely flush and to extend in alignment with the front surface of the adjacent cutter blade portion 40 held by 22 upon that assembly, so that the effective cutting operation on use, of my novel dry land chisel blade unit 40–22, shown as D', is by said front aligned outer surfaces and so that dirt slides from the lower cutting front edge of the cutting blade 40 upward and over the juncture point between 22c and 41, and up and over the front outer surface of the upper leg 22b without any obstruction at that junction point.

In FIG. 8, I illustrate another modification of my invention, wherein I also utilize a modified but similar novel spring-tensioned matrix yoke member 52 to replaceably hold my novel chisel cutter blade 40c thereinto as a novel replaceable blade unit combination. In this modification, of my novel spring-tensioned yoke, I provide an upper looped spring arm 52b, of the normal configuration shown, in FIG. 8 instead of the arm 22b in the prior modification. The blade 40c snaps into and between that arm 52b and the longer arm 52a, and with the lower holding rib 52c of 52 meshing as before into groove 51 of the blade 40c, since in this modified spring yoke I form the two arms 52a and 52b so that they normally are spring-tensioned formed to compress in very close proximity toward each other, as shown in FIG. 8, and so that there is normally insufficient room between 52a and 52b to normally insert the cutter blade 40 therebetween. I form the cutter blade 40c with an indented groove 41 as before, and with the reduced neck end 40a having a slanting smaller end edge. It will be seen that this modification blade 40c may be forcibly placed between the arms 52a and 52b, by that forceful entry spring tensionally expanding 52b from 52a apart and the blade 40c snapped into place with the rib 52c meshing securely into groove 51, by a manual forcing movement of the blade 40c therebetween or substantially to the right as viewed in FIG. 8 into the position shown in dotted lines. Bolt 23 is used to accentuate the normal spring tension holding action of the arm 52b toward arm 52a thereof and so that during use the blade 40c does not become removed from the member 52. To remove the blade from my modified unit member 52, the bolt 23 has to be loosened. By the dotted lines of FIG. 8 I have meant to illustrate how the blade 40c is pushed with its end 40a into and between the arms 52a and 52b against the spring tension of yoke 52 and then the bolt 23 is tightened to assist in holding the blade 40c removably by those yoke arms. It will be further seen, in this modification of my novel blade and spring yoke 52 unit, that I utilize the spring tension to assist in the use of the blade therein. Whereas, in my preferred embodiment shown in FIGS. 6 and 7, I utilize the spring tension to held effect a quick release of the yoke arms 22b and 22a, for replacement of a blade 40 thereinto and therebetween, as previously explained. I have found it a matter of choice as to which type of spring tensioned yoke, 22 or 52, to use as each has its advantage within the teaching of my novel replaceable cutter blade and spring-tensioned yoke holding means combined unit.

Figure 5:
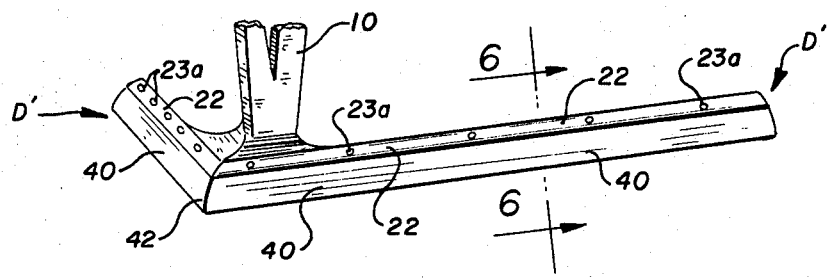
FIG. 5 is an enlarged perspective view of my novel replaceable V-shaped duckfoot chisel blade and cutter edge combination Unit D'.

Replacement of either front cutter blade 40, on either side of my novel V-shaped 6-foot wide duckfoot composite blade D' of FIGS. 5, 6 and 7, for example, can be accomplished upon release of the bolt 23 holding the respective yoke 22 on that side of the foot without having to loosen those on the other side of the apex of the V-blade, and thus providing a simple and comparatively inexpensive replacement job for the farmer when it is time to replace either side of the V-shaped cutting blade edge.

It will be obvious to those skilled in the art that many changes and modifications may be made in the preferred embodiments of my invention herein illustrated taught and described in detail; and, therefore, I wish to be bound in the teaching, spirit, scope and extent of my invention only by the hereunto appended claims.

I claim:

1. In a horizontal dirt chisel tool, in combination, a rigid carrier arm secured to and carried by the underside of a tool carrier frame, a rigid frog foot base member having a bolt opening therethrough and secured to and carried by said arm, and a horizontal replaceable chisel blade unit removably secured to and carried by said frog foot base and comprising a single spring-tensioned matrix yoke member having overlapping normally spaced apart arms, each of said arms having an aligned bolt opening, a bolt-securing means extending through said arm opening and through the opening of the frog foot base for thereby removably securing the yoke to the frog base by thereby compressing the arms together against the spring tension of the yoke member, and a removable earth cutter blade having a portion thereof inserted between and clampingly held by the arms of the tensioned yoke member before and upon securement of the yoke to the frog foot base member by the bolt-securing means, whereby upon release of the bolt-securing means the spring tension of the yoke member causes its arms to become spaced apart for thereby automatically releasing the cutter blade portion from between the yoke arms.

2. In combination, a dirt chisel tool having a replaceable cutter blade portion as defined in claim 1 and characterized further by the definition of one or the other of one side of the cutter blade adjacent the portion thereof held by the yoke member and the inner surface of the arm of the yoke member adjacent that side of the cutter blade having a horizontal projecting rib or a matching horizontal depression groove formed as a part thereof, and the other of said side portion of the cutter blade and of said inner surface of the adjacent arm of the yoke member having the other of said horizontal rib and said horizontal groove formed as a part thereof, said rib and said groove being adapted upon alignment with each other to mesh snugly together upon the holding of the arms of the yoke together by said bolt means.

3. In combination with a horizontally carried rigid frog foot base secured to a carriage for carrying an earth chisel blade removable secured to a surface of said foot, said frog foot base having a bolt opening therethrough, a removable and replaceable chisel blade unit, comprising a replaceable earth chisel blade member, a cross-sectional U-shaped single spring-tensioned matrix yoke holding means having a bolt opening therethrough and adapted to receive and hold a portion of the replaceable chisel blade member therein, a removable bolt-holding means extending through the bolt opening of each of the yoke means and said frog foot base for thereby causing the yoke member means to removably securely clamp and hold the chisel blade therein, and with one outer surface of the U-shaped yoke means and a corresponding one outer surface of the cutter blade being in extended alignment with each other when the blade is so held in and by the yoke means.

UNITED STATES PATENT OFFICE
CERTIFICATE OF CORRECTION

Patent No. 3,556,229          Dated January 19, 1971

Inventor(s)    Roy I. Hawkins

It is certified that error appears in the above-identified patent and that said Letters Patent are hereby corrected as shown below:

Column 5, line 15, "held" should read -- help --. Column lines 41 and 44, and Column 6, lines 4, 29, 31 and 39, "frog foot", each occurrence, should read -- frog-foot --. Column 5, line 44, after "comprising" insert -- : --. Column 6, line 4, "opening" should read -- openings --; line 10, "frog foot base should read -- frog-base --; line 31, "removeable" should read -- removeably --; line 33, after "comprising" insert -- : --.

This certificate supersedes Certificate of Correction issued July 27, 1971.

Signed and sealed this 23rd day of May 1972.

(SEAL)
Attest:

EDWARD M. FLETCHER, JR.          ROBERT GOTTSCHALK
Attesting Officer                Commissioner of Patent